United States Patent
Midorikawa et al.

(10) Patent No.: US 8,351,790 B2
(45) Date of Patent: Jan. 8, 2013

(54) OPTICAL OADM TRANSMISSION SYSTEM WITH LOOPBACK

(75) Inventors: Yuhiro Midorikawa, Kawasaki (JP); Izumi Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 12/892,915

(22) Filed: Sep. 28, 2010

(65) Prior Publication Data

US 2011/0076017 A1 Mar. 31, 2011

(30) Foreign Application Priority Data

Sep. 30, 2009 (JP) ................................. 2009-226962

(51) Int. Cl.
*H04J 14/02* (2006.01)
(52) U.S. Cl. ............................................ 398/83; 398/55
(58) Field of Classification Search ............... 398/55–57, 398/83–85
See application file for complete search history.

(56) References Cited

U.S. PATENT DOCUMENTS

| | | | |
|---|---|---|---|
| 6,466,348 B1 | 10/2002 | Izumi | |
| 6,973,267 B1 * | 12/2005 | Arecco et al. | 398/4 |
| 7,551,857 B2 | 6/2009 | Fukushi et al. | |
| 8,103,161 B2 * | 1/2012 | Li | 398/4 |
| 2002/0101633 A1 * | 8/2002 | Onaka et al. | 359/119 |
| 2002/0196489 A1 * | 12/2002 | Terahara et al. | 359/110 |
| 2005/0259990 A1 * | 11/2005 | Yokota | 398/92 |

FOREIGN PATENT DOCUMENTS

| | | |
|---|---|---|
| JP | 2000-312046 A | 11/2000 |
| JP | 2004-173309 A | 6/2004 |
| JP | 2006-33412 A | 2/2006 |

* cited by examiner

*Primary Examiner* — Nathan Curs
(74) *Attorney, Agent, or Firm* — Fujitsu Patent Center (57) ABSTRACT

An optical transmission system including: first, second, and third stations; a main transmission path that bi-directionally couples the first station with the second station; and an optical add/drop multiplexer (OADM) disposed on the main transmission path, the OADM branching light from the first and second station, combining light from the third station to the main transmission path; wherein the OADM includes an input determination unit and an optical path switching unit, the input determination unit detects the power of the lights, and determines whether each of the input lights is lost or not, and the optical path switching unit forms a loop-back route based on the determination.

7 Claims, 8 Drawing Sheets

OPTICAL OADM TRANSMISSION SYSTEM WITH LOOPBACK

CROSS-REFERENCE TO RELATED APPLICATIONS

This application is based upon and claims the benefit of priority from the prior Japanese Patent Application No. 2009-226962 filed on Sep. 30, 2009, the entire contents of which are incorporated herein by reference.

FIELD

The embodiments discussed herein are related to an optical transmission apparatus and an optical transmission system for transmitting a wavelength division multiplexed light.

BACKGROUND

In recent years, in order to flexibly operate an optical communication network, an optical transmission system that includes an optical add/drop multiplexer (OADM) disposed on a transmission path that couples a plurality of terminal stations that transmit and receive wavelength division multiplexed (WDM) light has been used. For example, in submarine optical WDM transmission systems, an OADM system including a branching unit (BU) located on the main transmission path is used. A submarine optical WDM transmission system includes a main transmission path that bi-directionally couples between two trunk line stations. The BU branches a signal light having a certain wavelength transmitted from a WDM light propagating in the main transmission path and transmits the signal light. In addition, the BU adds to the WDM light a signal light having a certain wavelength and being transmitted from the branch station. In particular, such a branching unit used in the OADM system is referred to as an "OADM-BU".

In submarine optical WDM transmission systems including the OADM-BU described above, a state in which part of a signal light input to the OADM-BU disappears may occur due to a faulty submarine optical cable, malfunction of an optical repeater that amplifies a WDM light on a transmission path and relays the WDM light, or interruption of the supply of power to the optical repeater (hereinafter referred to as an "input signal loss state"). In addition, when a submarine optical cable or an optical repeater is repaired, the supply of power to the optical repeater in the section to be repaired is stopped using the OADM-BU. Thereafter, a repair operation is performed using a cable repair ship. Accordingly, the OADM-BU enters an input signal loss state during a period for which the repair operation is being performed.

As described above, when the OADM-BU enters an input signal loss state, a signal light transmitted in a section that is not related to the faulty section may be affected and, therefore, the quality of transmission in the section may be degraded. The degradation of transmission quality is caused because the WDM light output from the OADM-BU in an input signal loss state does not include the wavelength of a signal light in an input signal loss state, and the number of wavelengths and the total power of the WDM light are reduced from those before a failure occurs. This situation is described in more detail below with reference to a specific example.

Figure 1:
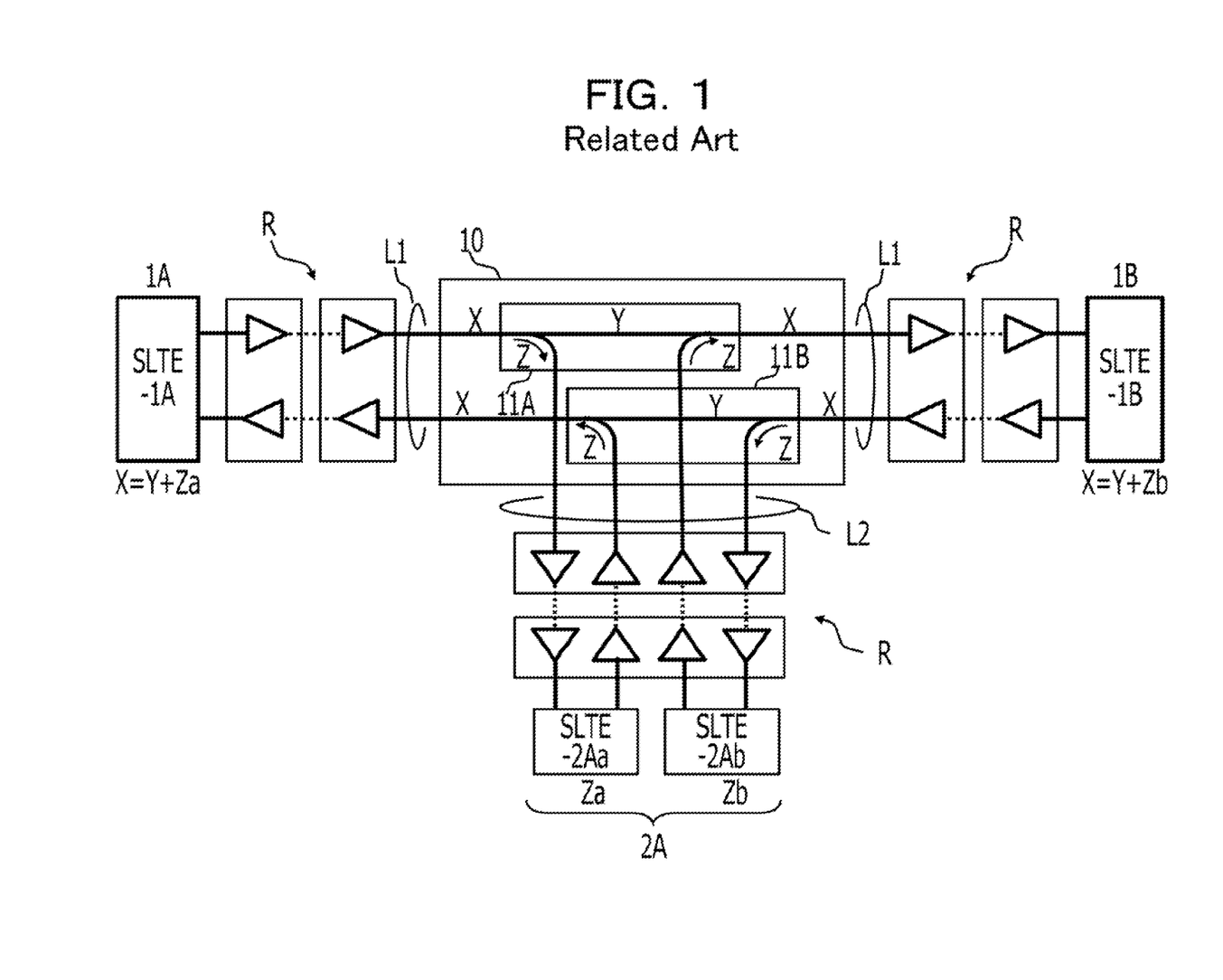
FIG. 1 is a block diagram of an exemplary configuration of a submarine optical WDM transmission system including a widely used OADM-BU.

FIG. 1 is a block diagram of the configuration of a submarine optical WDM transmission system including a widely used OADM-BU. The submarine optical WDM transmission system includes a submarine optical WDM terminal station apparatus SLTE-1A disposed in a trunk line station 1A, a submarine optical WDM terminal station apparatus SLTE-1B disposed in a trunk line station 1B, and a branch station 2A. The submarine optical WDM transmission system further includes a plurality of optical repeaters R and an OADM-BU 10 on a main transmission path L1 between the submarine optical WDM terminal station apparatuses SLTE-1A and SLTE-1B. Furthermore, the submarine optical WDM transmission system includes a plurality of optical repeaters R on a branch transmission path L2 between an input/output port of the OADM-BU 10 on the branch side and a pair consisting of submarine optical WDM terminal station apparatuses SLTE-2Aa and SLTE-2Ab in the branching station 2A.

Each of the optical repeaters R on the main transmission path L1 includes two optical amplifiers that amplify a WDM light transmitted bi-directionally. Each of the optical repeaters R on the branch transmission path L2 includes two optical amplifiers that amplify a signal light bi-directionally transmitted between the trunk line station 1A and the branch station 2A via an OADM-BU 10, and includes two optical amplifiers that amplify a signal light bi-directionally transmitted between the trunk line station 1B and the branch station 2A via an OADM-BU 10.

The OADM-BU 10 includes an optical circuit 11A. The optical circuit 11A branches a WDM light transmitted from the trunk line station 1A to the trunk line station 1B to a signal light having a specific wavelength and transmits the signal light to the branch station 2A. In addition, the optical circuit 11A adds to the main transmission path L1 a signal light having a specific wavelength transmitted from the branch station 2A to the trunk line station 1B. The OADM-BU 10 further includes an optical circuit 11B. The optical circuit 11B branches a WDM light transmitted from the trunk line station 1B to the trunk line station 1A to a signal light having a specific wavelength, and transmits the signal light to the branch station 2A. In addition, the optical circuit 11A adds to the main transmission path L1 a signal light having a specific wavelength transmitted from the branch station 2A to the trunk line station 1A.

In this example, Y denotes the number of wavelengths of a signal light transmitted from the trunk line station 1A to the trunk line station 1B. In addition, the number of wavelengths of the signal light transmitted from the trunk line station 1B to the trunk line station 1A is the same number Y. Za denotes the number of wavelengths of a signal light transmitted between the trunk line station 1A and the branch station 2A, and Zb denotes the number of wavelengths of a signal light transmitted between the trunk line station 1B and the branch station 2A. Hereinafter, for simplicity, the following setting is used: $Za=Zb=Z$. In such setting of the numbers of wavelengths, $X=Y+Z$, where X represents a total number of wavelengths of a WDM light amplified by each of the optical amplifiers included in each of the optical repeaters R on the main transmission path L1.

Figure 2:
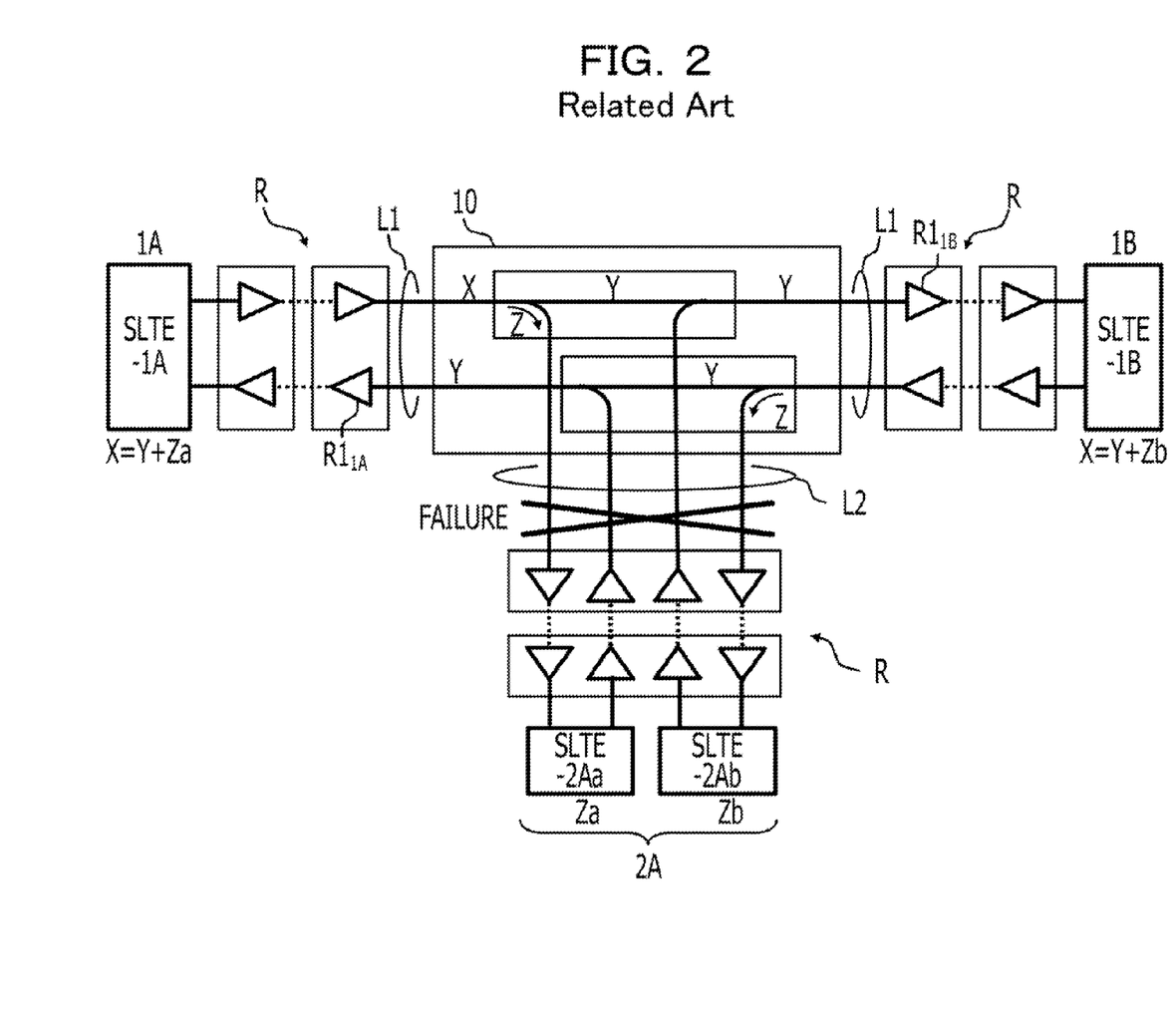
FIG. 2 illustrates an exemplary operation performed by the system shown in FIG. 1 when a failure occurs on a branch transmission path.

For example, suppose that in a submarine optical WDM transmission system as described above, a failure occurs on the branch transmission path L2 that is coupled to the input/output port of the OADM-BU 10 on the branch side, as shown in FIG. 2. At that time, a signal light transmitted from the branch station 2A to each of the trunk line stations 1A and 1B is not provided to an input port of the OADM-BU 10 on the branch side. Thus, the OADM-BU 10 enters an input signal loss state. Accordingly, the total number of wavelengths of a WDM light output from the OADM-BU 10 to each of the main transmission path L1 on the side of the trunk line station 1A and the main transmission path L1 on the side of the trunk line station 1B is reduced from $X$ ($=Y+Z$) before the input signal is lost, to Y after the input signal is lost. Therefore, the total power of the WDM light is reduced to Y/X=Y/(Y+Z) of the original power after the input signal is lost.

The WDM light having reduced total power propagates in the main transmission path L1 on the side of the trunk line station 1A and is input to an optical amplifier R11A of the optical repeater R next to the OADM-BU 10. In addition, the WDM light having reduced total power propagates in the main transmission path L1 on the side of the trunk line station 1B and is input to an optical amplifier R11B of the optical repeater R next to the OADM-BU 10. In general, the optical amplifying operation performed by each of the optical amplifiers R11A and R11B is controlled so that the total power of the output WDM light is constant, regardless of the total power of the input WDM light. Accordingly, under the condition that the OADM-BU 10 is in an input signal loss state due to the occurrence of a failure of the branch transmission path L2, the power of a signal light for each of the wavelengths of the WDM light output from each of the optical amplifiers R11A and R11B is increased by 10·log(X/Y) [dB] as compared with the power of a signal light for each of the wavelengths before the input signal loss state occurs.

As specific examples, the following two cases are discussed:

Case (1): X=80, Y=60, and Z=20, and
Case (2): X=80, Y=20, and Z=60.

In case (1), the power of the signal light for each of the wavelengths of the WDM light output from each of the optical amplifiers R11A and R11B is increased by 10·log(80/60)= about 1.2 [dB] after the input signal loss state has occurred.

In contrast, in case (2), the power is increased by 10·log (80/20)=about 6.0 [dB].

If the power of the signal light for each of the wavelengths output from each of the optical amplifiers R11A and R11B to the main transmission path L1 exceeds an input limiting value determined by the type of optical fiber used for the main transmission path L1, waveform distortion of the signal light occurs due to an increase in a non-linear effect occurring during transmission in the optical fiber. Accordingly, depending on the setting of the number of wavelengths, the quality of transmission of the signal light on the main transmission path L1 between the trunk line stations 1A and 1B that is not related to a failure occurring on the branch transmission path L2 may be degraded.

Figure 3:
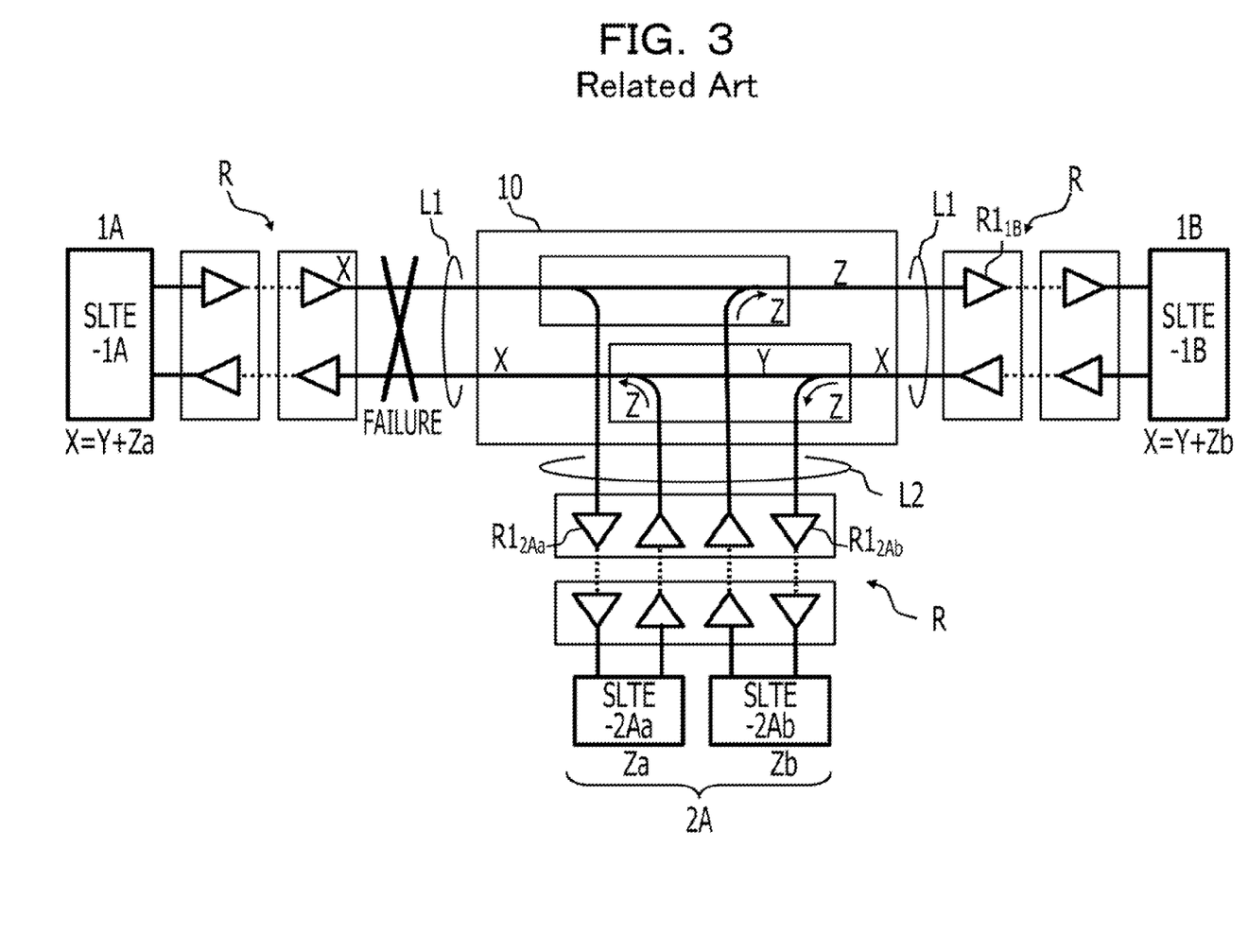
FIG. 3 illustrates an exemplary operation performed by the system shown in FIG. 1 when a failure occurs on a main transmission path.

Furthermore, for example, if, as shown in FIG. 3, a failure occurs in the main transmission path L1 on the side of the trunk line station 1A coupled to the OADM-BU 10, the WDM light transmitted from the trunk line station 1A to the trunk line station 1B is not input to the OADM-BU 10. Thus, the OADM-BU 10 enters an input signal loss state. As a result, the total number of wavelengths of the WDM light output from the OADM-BU 10 to the main transmission path L1 on the side of the trunk line station 1B is reduced from X (=Y+Z) to Z after the input signal loss has occurred and, therefore, the total power of the WDM light is reduced to Z/X=Z/(Y+Z) of the original power after the input signal loss has occurred.

Accordingly, as in the case shown in FIG. 2, the power of the signal light for each of the wavelengths of the WDM light output from the optical amplifier R11B of the optical repeater R next to the OADM-BU 10 on the side of the trunk line station 1B is increased by 10·log(X/Z) [dB] as compared with the power of a signal light for each of the wavelengths before the input signal loss state occurs.

More specifically, in the setting of the number of wavelengths as in case (1), the power of the signal light for each of the wavelengths is increased by 10·log(80/20)=about 6.0 [dB] after the input signal loss state has occurred.

In contrast, in the setting of the number of wavelengths as in case (2), the power is increased by 10·log(80/60)=about 1.2 [dB].

If the power of the signal light for each of the wavelengths output from the optical amplifier R11B to the main transmission path L1 exceeds the input limiting value of the main transmission path L1, waveform distortion of the signal light occurs due to an increase in a non-linear effect. Accordingly, depending on the setting of the number of wavelengths, the quality of transmission of the signal light transmitted from the branch station 2A and received by the trunk line station 1B that is not related to a failure occurring on the branch transmission path L1 on the side of the trunk line station 1A may be degraded.

Although not shown, if a failure occurs on the main transmission path L1 coupled to the OADM-BU 10 on the side of the trunk line station 1B, the power of the signal light for each of the wavelengths of the WDM light output from the optical amplifier R11A of the optical repeater R next to the OADM-BU 10 on the side of the trunk line station 1A is increased by 10·log(X/Z) [dB] as compared with the power of a signal light for each of the wavelengths before the input signal loss state occurs. Accordingly, depending on the setting of the number of wavelengths, the quality of transmission of the signal light transmitted from the branch station 2A and received by the trunk line station 1A that is not directly related to a failure occurring on the branch transmission path L1 on the side of the trunk line station 1B may be degraded.

In order to prevent or reduce the above-described degradation of the transmission quality caused by an input signal loss state of an OADM-BU, the following techniques have been developed.

For example, Japanese Laid-Open Patent Publication No. 2000-312046 discloses a technique for maintaining the output of an optical repeater in a desirable state by combining a reference light having a wavelength different from that of a main signal light with a WDM light, transmitting the combined light, and controlling the gain of an optical amplifier in the optical repeater on the basis of the intensity information of the reference light.

In addition, for example, Japanese Laid-Open Patent Publication No. 2006-33412 discloses a technique for, when detecting that an input signal input to an optical repeater is lost due to the occurrence of a failure in the transmission path, stopping the transmission of a signal light by the upstream terminal station apparatus, making the intensity of the amplified spontaneous emission (ASE) light of an optical amplifier in the terminal station apparatus equal to the intensity of the signal light of one wavelength, outputting the ASE light to the transmission path, and setting the gain of an optical repeater disposed upstream of a point at which the failure has occurred on the basis of the intensity of the ASE light.

SUMMARY

According to an aspect of the invention, an optical transmission system including: first, second, and third terminal stations each transmitting and receiving a WDM light formed by combining a plurality of lights having different wavelengths; a main transmission path that bi-directionally couples the first terminal station with the second terminal station; and an optical add/drop multiplexer disposed on the main transmission path, the optical add/drop multiplexer branching light having a certain wavelength from a WDM light input from the main transmission path on the side of the first terminal station and outputting the branched light to a branch transmission path coupled with the third terminal station, the optical add/drop multiplexer combining a light input from the branch transmission path with lights included in the WDM light other than the light having the certain wavelength and outputting the combined light to the main transmission path on the side of the second terminal station, the optical add/drop multiplexer branching light having a certain wavelength from a WDM light input from the main transmission path on the side of the second terminal station and outputting the branched light to the branch transmission path, and the optical add/drop multiplexer combining a light input from the branch transmission path with lights included in the WDM light other than the light having the certain wavelength and outputting the combined light to the main transmission path on the side of the first terminal station; wherein the optical add/drop multiplexer includes an input determination unit and an optical path switching unit, and wherein the input determination unit detects the power of the light input from the main transmission path on the side of the first terminal station, the power of the light input from the main transmission path on the side of the second terminal station, and the power of the light input from the branch transmission path and determines whether each of the input lights is lost or not, and wherein, if the input determination unit determines that any one of the input lights is lost, the optical path switching unit forms a loop-back route by decoupling an optical path through which an output light is output to the transmission path that corresponds to the input light that is propagated from the transmission path, and coupling the optical path to the opposing optical path to which the input light is provided from the transmission path.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT(S)

In order to prevent or reduce degradation of the transmission quality caused by an input signal loss state of an OADM-BU by using existing control techniques based on a reference light, a light source for generating the reference light is required in addition to a light source for a main signal light.

This requirement makes the configuration of a terminal station complicated and costly. In addition, since a frequency band for the reference light is required in addition to the frequency band for the main signal light, the transmission capacity is disadvantageously decreased.

The case in which an optical repeater is controlled using a light different from the main signal light (e.g., a reference light or an ASE light emitted from an optical amplifier) (hereinafter referred to a "dummy light") is discussed below.

In such a case, if a failure occurs in an optical cable coupled to the input port of an OADM-BU (refer to FIG. 3), a dummy light output from a terminal station or an optical repeater disposed upstream of a point at which the failure has occurred does not reach an OADM-BU and an optical repeater disposed downstream of the point at which the failure has occurred. Accordingly, the optical repeater disposed downstream of the OADM-BU cannot be controlled on the basis of the intensity of the dummy light, which is problematic.

An embodiment of the present invention is described in detail below with reference to the accompanying drawings.

Figure 4:
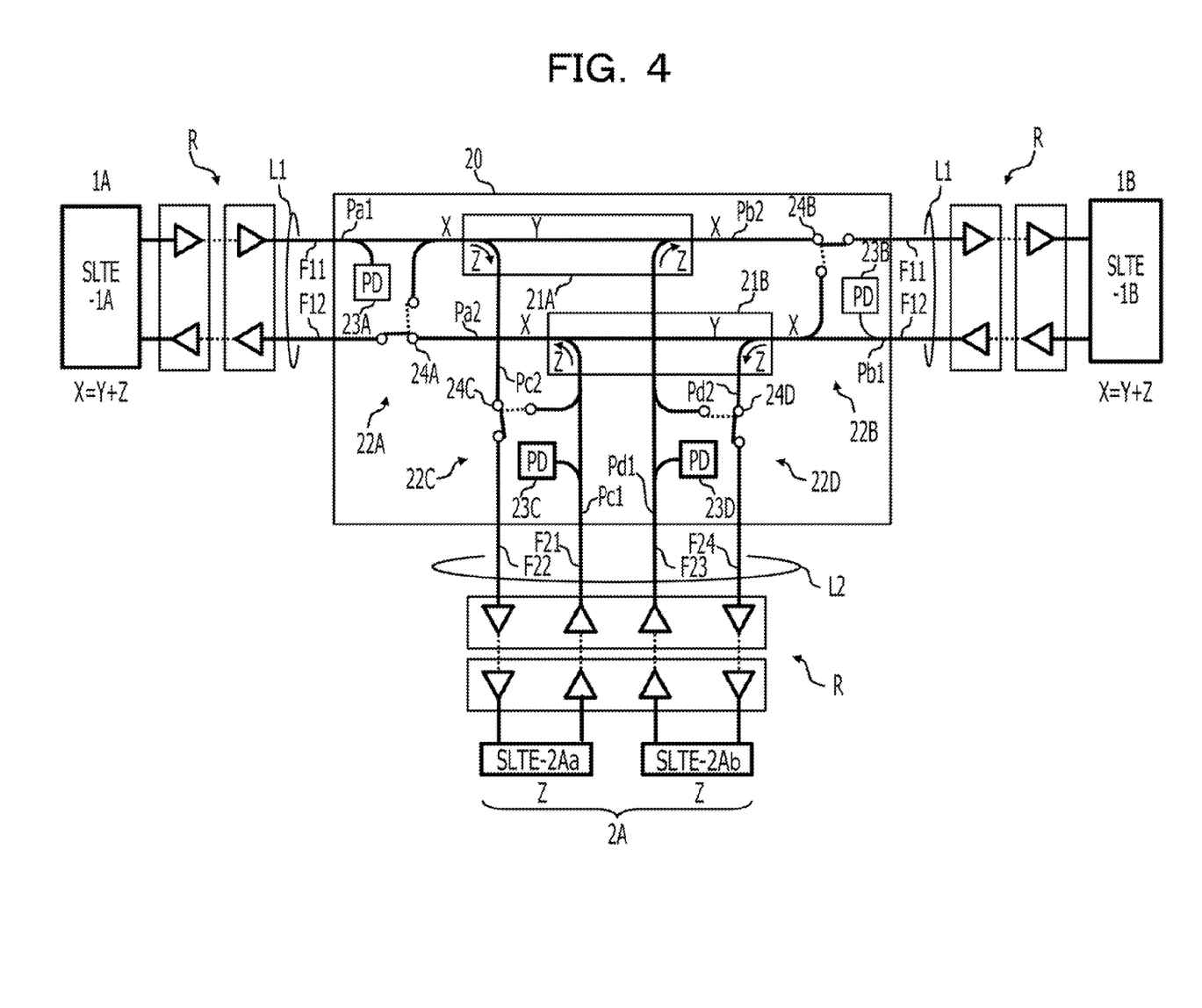
FIG. 4 is a block diagram of the configuration of an optical transmission system according to an embodiment of the present invention.

FIG. 4 is a block diagram of the configuration of an optical transmission system according to the present embodiment.

According to the present embodiment, the optical transmission system includes a submarine optical WDM terminal station apparatus SLTE-1A in a trunk line station 1A serving as a first terminal station, the submarine optical WDM terminal station apparatus SLTE-1B in a trunk line station 1B serving as a second terminal station, and a branch station 2A. The optical transmission system further includes a plurality of optical repeaters R and an optical add/drop multiplexer (an OADM-BU) 20 disposed on a main transmission path L1 that bi-directionally couples the submarine optical WDM terminal station apparatus SLTE-1A to the submarine optical WDM terminal station apparatus SLTE-1B. In addition, the optical transmission system includes a plurality of optical repeaters R on a branch transmission path L2 that bi-directionally couples an input/output port of the OADM-BU 20 on the branch side to a pair consisting of submarine optical WDM terminal station apparatuses SLTE-2Aa and SLTE-2Ab in the branching station 2A serving as a third terminal station.

The submarine optical WDM terminal station apparatus SLTE-1A generates signal lights of different Y wavelengths that are to be transmitted to the submarine optical WDM terminal station apparatus SLTE-1B and signal lights of different Z wavelengths that are to be transmitted to the branch station 2A and combines the signal lights into the WDM light having a number of wavelengths of X (=Y+Z). Thereafter, the submarine optical WDM terminal station apparatus SLTE-1A outputs the WDM light to an optical fiber F11 of the main transmission path L1. In addition, the submarine optical WDM terminal station apparatus SLTE-1A receives the WDM light transmitted through an optical fiber F12 of the main transmission path L1 in a direction opposite to the direction in which the WDM light output to the main transmission path L1 is propagated. The WDM light input to the submarine optical WDM terminal station apparatus SLTE-1A includes the signal lights of different Y wavelengths transmitted from the submarine optical WDM terminal station apparatus SLTE-1B and the signal lights of different Z wavelengths transmitted from the branch station 2A. The number of wavelengths of the WDM light is X (=Y+Z).

The submarine optical WDM terminal station apparatus SLTE-1B generates signal lights of different Y wavelengths that are to be transmitted to the submarine optical WDM terminal station apparatus SLTE-1A and signal lights of different Z wavelengths that are to be transmitted to the branch station 2A and combines the signal lights into the WDM light having a number of wavelengths of X (=Y+Z). Thereafter, the submarine optical WDM terminal station apparatus SLTE-1A outputs the WDM light to the optical fiber F12 of the main transmission path L1. In addition, the submarine optical WDM terminal station apparatus SLTE-1B receives the WDM light transmitted through the optical fiber F11 of the main transmission path L1 in a direction opposite to the direction in which the WDM light output to the main transmission path L1 propagates. The WDM light input to the submarine optical WDM terminal station apparatus SLTE-1B includes the signal lights of different Y wavelengths transmitted from the submarine optical WDM terminal station apparatus SLTE-1A and the signal lights of different Z wavelengths transmitted from the branch station 2A. The number of wavelengths of the WDM light is X (=Y+Z).

The submarine optical WDM terminal station apparatus SLTE-2Aa in the branch station 2A generates signal lights of different Z wavelengths that are to be transmitted to the submarine optical WDM terminal station apparatus SLTE-1A and outputs the generated signal lights to an optical fiber F21 of the branch transmission path L2. In addition, the submarine optical WDM terminal station apparatus SLTE-2Aa receives signal lights transmitted through an optical fiber F22 of the branch transmission path L2 in a direction opposite to the direction in which the output signal lights propagate. The signal lights input to the submarine optical WDM terminal station apparatus SLTE-2Aa are the signal lights of different Z wavelengths transmitted from the submarine optical WDM terminal station apparatus SLTE-1A.

The submarine optical WDM terminal station apparatus SLTE-2Ab in the branch station 2A generates signal lights of different Z wavelengths that are to be transmitted to the submarine optical WDM terminal station apparatus SLTE-1B and outputs the generated signal lights to an optical fiber F23 of the branch transmission path L2. In addition, the submarine optical WDM terminal station apparatus SLTE-2Ab receives signal lights transmitted through an optical fiber F24 of the branch transmission path L2 in a direction opposite to the direction in which the output signal lights propagate. The signal lights input to the submarine optical WDM terminal station apparatus SLTE-2Ab are the signal lights of different Z wavelengths transmitted from the submarine optical WDM terminal station apparatus SLTE-1B.

Each of the optical repeaters R on the main transmission path L1 includes two optical amplifiers that amplify the WDM lights transmitted through the optical fibers F11 and F12. Each of the optical repeaters R on the branch transmission path L2 includes two optical amplifiers that amplify the signal lights transmitted through the optical fibers F21 and F22 on the side of the submarine optical WDM terminal station apparatus SLTE-1A, and two optical amplifiers that amplify the signal lights transmitted through the optical fibers F23 and F24 on the side of the submarine optical WDM terminal station apparatus SLTE-1B.

The OADM-BU 20 includes optical circuits 21A and 21B. The OADM-BU 20 further includes an input/output unit 22A coupled to the main transmission path L1 located on the side of the submarine optical WDM terminal station apparatus SLTE-1A and an input/output unit 22B coupled to the main transmission path L1 located on the side of the submarine optical WDM terminal station apparatus SLTE-1B.

The OADM-BU 20 further includes input determination circuits (PD) 23A, 23B, 23C, and 23D for an input/output unit 22C coupled to the optical fibers F21 and F22 of the branch transmission path L2 and optical path switching circuits 24A, 24B, 24C, and 24D for an input/output unit 22D coupled to the optical fibers F23 and F24 of the branch transmission path L2.

The optical circuit 21A separates a signal light corresponding to a certain wavelength (a drop wavelength (or a branching wavelength)) from the WDM light input from the optical fiber F11 of the main transmission path L1 on the side of the submarine optical WDM terminal station apparatus SLTE-1A and outputs the signal light to the optical fiber F22 of the branch transmission path L2. In addition, the optical circuit 21A combines the remainder of the signal lights included in the WDM light with the signal light to be transmitted from the branch station 2A to the submarine optical WDM terminal station apparatus SLTE-1B. Thereafter, the optical circuit 21A outputs the combined signal lights to the optical fiber F11 of the main transmission path L1 on the side of the submarine optical WDM terminal station apparatus SLTE-1B.

The optical circuit 21B separates a signal light corresponding to a drop wavelength from the WDM light input from the optical fiber F12 of the main transmission path L1 on the side of the submarine optical WDM terminal station apparatus SLTE-1B, and outputs the signal light to the optical fiber F24 of the branch transmission path L2. In addition, the optical circuit 21B combines the remainder of the signal lights included in the WDM light with the signal light to be transmitted from the branch station 2A to the submarine optical WDM terminal station apparatus SLTE-1A. Thereafter, the optical circuit 21B outputs the combined signal light to the optical fiber F12 of the main transmission path L1 on the side of the submarine optical WDM terminal station apparatus SLTE-1A.

Figure 5A:
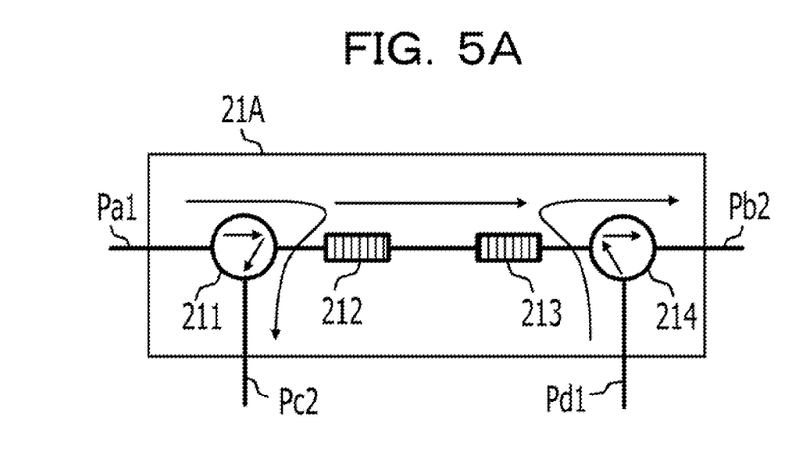
FIG. 5A illustrates an example of the configuration of an optical circuit 21A of the system shown in FIG. 4.
Figure 5B:
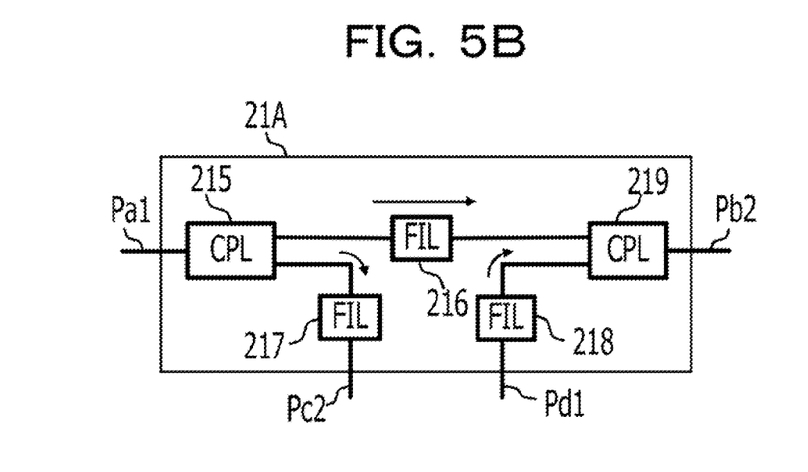
FIG. 5B illustrates another example of the configuration of the optical circuit 21A of the system shown in FIG. 4.

FIGS. 5A and 5B illustrate examples of the configuration of the optical circuit 21A. Note that since the configuration of the optical circuit 21B is generated by reversing the relationship between the submarine optical WDM terminal station apparatuses SLTE-1A and SLTE-1B in the optical circuit 21A, description of the optical circuit 21B is not repeated.

As shown in FIG. 5A, a first example configuration of the optical circuit 21A includes two optical circulators 211 and 214 and two fiber Bragg gratings (FBGs) 212 and 213. The optical circulator 211 has three ports and unidirectionally transmits light between any two ports. The WDM light input from the optical fiber F11 of the main transmission path L1 on the side of the submarine optical WDM terminal station apparatus SLTE-1A to the OADM-BU 20 is provided to the first port of the optical circulator 211 via an optical path Pa1. In addition, the WDM light is output from the second port. One end of the FBG 212 is coupled to the second port of the optical circulator 211. Part of the light output from the second port is reflected by the FBG 212 and is returned to the second port, and the reflected light is output from the third port of the optical circulator 211. An optical path Pct that is coupled to the optical fiber F22 of the branch transmission path L2 is coupled to the third port of the optical circulator 211.

The FBG 212 has an optical property such that, among the signal lights of different wavelengths included in the WDM light output from the second port of the optical circulator 211, the FBG 212 reflects light corresponding to the wavelength of the signal light transmitted to the branch station 2A and allows light corresponding to the wavelength of the signal light transmitted to the side of the submarine optical WDM terminal station apparatus SLTE-1B to pass through. One end of the FBG 213 is coupled to the other end of the optical circulator 211 remote from the optical circulator 211. The FBG 213 has an optical property such that the FBG 213 allows the transmission light of the FBG 212 (i.e., the light corresponding to the wavelength of the signal light transmitted from the submarine optical WDM terminal station apparatus SLTE-1A to the submarine optical WDM terminal station apparatus SLTE-1B) to pass through and reflects the light corresponding to the wavelength of the signal light transmitted from the branch station 2A to the submarine optical WDM terminal station apparatus SLTE-1B.

Like the optical circulator 211, the optical circulator 214 has three ports and unidirectionally transmits light between any two ports. The signal light input from the optical fiber F23 of the branch transmission path L2 to the OADM-BU 20 is provided to the first port of the optical circulator 214 via an optical path Pd1. In addition, the optical circulator 214 outputs the signal light from the second port. The other end of the FBG 213 is coupled to the second port of the optical circulator 214. A light output from the second port is reflected by the FBG 213 and is returned to the second port together with a transmission light of the FBG 213. The reflected light and the transmission light are output from the third port of the optical circulator 214. An optical path Pb2 that is coupled to the optical fiber F11 of the main transmission path L1 on the side of the submarine optical WDM terminal station apparatus SLTE-1B is coupled to the third port of the optical circulator 214.

As shown in FIG. 5B, a second example configuration of the optical circuit 21A includes two optical couplers (CPLs) 215 and 219 and three optical filters (FILs) 216, 217, and 218. The optical coupler 215 separates the WDM light input from the optical fiber F11 of the main transmission path L1 on the side of the submarine optical WDM terminal station apparatus SLTE-1A to the OADM-BU 20 and propagating through the optical path Pa1 into two lights at a certain branching ratio and outputs the two lights to the optical filters 216 and 217.

Among the signal lights of different wavelengths included in the WDM light separated by the optical coupler 215, the optical filter 216 allows the signal light of a wavelength to be transmitted to the submarine optical WDM terminal station apparatus SLTE-1B to pass through. The signal light that has passed through the optical filter 216 is provided to one of two input ports of the optical coupler 219. Among the signal lights of different wavelengths included in the WDM light separated by the optical coupler 215, the optical filter 217 allows the signal light of a wavelength to be transmitted to the branch station 2A to pass through. The signal light that has passed through the optical filter 217 is output to the optical path Pct coupled to the optical fiber F22 of the branch transmission path L2.

The other input port of the optical coupler 219 is coupled to the optical filter 218. Among the signal lights input from the optical fiber F23 of the branch transmission path L2 to the OADM-BU 20 and propagating through the optical path Pd1, the optical filter 218 allows the signal light to be transmitted from the branch station 2A to the submarine optical WDM terminal station apparatus SLTE-1B to pass through. The optical coupler 219 merges the signal light that has passed through the optical filter 216 with the signal light that has passed through the optical filter 218. Thereafter, the merged WDM light is output to the optical path Pb2 coupled to the optical fiber F11 of the main transmission path L1 on the side of the submarine optical WDM terminal station apparatus SLTE-1B.

Referring back to FIG. 4, the input determination circuits 23A to 23D disposed in the input/output units 22A to 22D detect the power of lights input from corresponding transmission paths to the input/output units 22A to 22D, respectively.

Thereafter, the input determination circuits 23A to 23D determine whether input signal loss occurs on the basis of the results of detection and sends the results of the determination to the optical path switching circuits 24A to 24D, respectively.

More specifically, the input determination circuit 23A separates part of the WDM light input from the optical fiber F11 of the main transmission path L1 on the side of the submarine optical WDM terminal station apparatus SLTE-1A to the OADM-BU 20 and propagating through the optical path Pa1. Thereafter, the input determination circuit 23A detects the power of the separated light. If the detected power is lower than a certain threshold value serving as a criterion of input signal loss, the input determination circuit 23A determines that the WDM light input from the main transmission path L1 on the side of the submarine optical WDM terminal station apparatus SLTE-1A is lost. However, if the detected power is higher than or equal to the certain threshold value, the input determination circuit 23A determines that the WDM light input from the main transmission path L1 on the side of the submarine optical WDM terminal station apparatus SLTE-1A is being input to the input/output unit 22A. Thereafter, the input determination circuit 23A sends the result of the determination to the optical path switching circuit 24A.

In addition, the input determination circuit 23B separates part of the WDM light input from the optical fiber F12 of the main transmission path L1 on the side of the submarine optical WDM terminal station apparatus SLTE-1B to the OADM-BU 20 and propagating through the optical path P131. Thereafter, the input determination circuit 23B detects the power of the separated light. If the detected power is lower than the threshold value, the input determination circuit 23B determines that the WDM light input from the main transmission path L1 on the side of the submarine optical WDM terminal station apparatus SLTE-1B is lost. However, if the detected power is higher than or equal to the threshold value, the input determination circuit 23B determines that the WDM light input from the main transmission path L1 on the side of the submarine optical WDM terminal station apparatus SLTE-1B is being input to the input/output unit 22B. Thereafter, the input determination circuit 23B sends the result of the determination to the optical path switching circuit 24B.

In addition, the input determination circuit 23C separates part of the WDM light input from the optical fiber F21 of the main transmission path L2 to the OADM-BU 20 and propagating through the optical path Pc1 to branch. Thereafter, the input determination circuit 23C detects the power of the separated light. If the detected power is lower than the threshold value, the input determination circuit 23C determines that the signal light input from the optical fiber F21 of the branch transmission path L2 is lost. However, if the detected power is higher than or equal to the threshold value, the input determination circuit 23C determines that the signal light input from the optical fiber F21 of the branch transmission path L2 is being input to the input/output unit 22C. Thereafter, the input determination circuit 23C sends the result of determination to the optical path switching circuit 24C.

In addition, the input determination circuit 23D separates part of the WDM light input from the optical fiber F23 of the main transmission path L2 to the OADM-BU 20 and propagating through the optical path Pd1. Thereafter, the input determination circuit 23D detects the power of the branched light. If the detected power is lower than the threshold value, the input determination circuit 23D determines that the signal light input from the optical fiber F23 of the branch transmission path L2 is lost. However, if the detected power is higher than or equal to the threshold value, the input determination circuit 23D determines that the signal light input from the optical fiber F23 of the branch transmission path L2 is being input to the input/output unit 22D. Thereafter, the input determination circuit 23D sends the result of determination to the optical path switching circuit 24D.

The optical path switching circuits 24A to 24D switch the optical paths in accordance with the results of the determination made by the input determination circuits 23A to 23D, respectively, so that one of the following two states occurs:

i) Each of the optical path switching circuits decouples the optical path through which the output light that is output to the corresponding transmission path is propagated from the transmission path and couples the optical path to the opposing optical path to which the input light is provided from the transmission path. In this way, a loop-back route is formed.

ii) Each of the optical path switching circuits keeps the optical path coupled to the transmission path through which the output light output to the corresponding transmission path propagates.

More specifically, the optical path switching circuit 24A has a configuration in which an optical switch with one input and two outputs is disposed on an optical path Pa2 through which a WDM light output to the optical fiber F12 of the main transmission path L1 on the side of the submarine optical WDM terminal station apparatus SLTE-1A is propagated via the optical circuit 21B.

The input port of the optical switch is coupled to the optical path Pa2 that is coupled to the trunk-line-side output end of the optical circuit 21B. In addition, one of the output ports of the optical switch is coupled to the optical path Pa2 that is coupled to the optical fiber F12 of the main transmission path L1 on the side of the submarine optical WDM terminal station apparatus SLTE-1A. Furthermore, the other output port of the optical switch is coupled to an optical path led out of the coupling point of the optical path Pa1 through which the WDM light input from the optical fiber F11 of the main transmission path L1 on the side of the submarine optical WDM terminal station apparatus SLTE-1A propagates and a trunk-line-side input end of the optical circuit 21A.

The coupling point is formed so that light from the optical path Pa1 is merged with light from the other output port at the coupling point.

In addition, the optical path switching circuit 24B has a configuration in which an optical switch with one input and two outputs is disposed on the optical path Pb2 through which a WDM light output is propagated to the optical fiber F11 of the main transmission path L1 on the side of the submarine optical WDM terminal station apparatus SLTE-1B via the optical circuit 21A.

The input port of the optical switch is coupled to the optical path Pb2 that is coupled to the trunk-line-side output end of the optical circuit 21A. In addition, one of the output ports of the optical switch is coupled to the optical path Pb2 that is coupled to the optical fiber F11 of the main transmission path L1 on the side of the submarine optical WDM terminal station apparatus SLTE-1B. Furthermore, the other output port of the optical switch is coupled to an optical path led out of the coupling point of the optical path Pb1 through which the WDM light input is propagated from the optical fiber F12 of the main transmission path L1 on the side of the submarine optical WDM terminal station apparatus SLTE-1B, and to a trunk-line-side input end of the optical circuit 21B.

The coupling point is formed so that light from the optical path Pb1 is merged with light from the other output port at the coupling point.

In addition, the optical path switching circuit 24C has a configuration in which an optical switch with one input and two outputs is disposed on the optical path Pc2 through which the signal light separated by the optical circuit 21A and output to the optical fiber F22 of the branch transmission path L2 is propagated.

The input port of the optical switch is coupled to the optical path Pc2 coupled to the branch-side output end of the optical circuit 21A. In addition, one of the output ports of the optical switch is coupled to the optical path Pc2 coupled to the optical fiber F22 of the branch transmission path L2. Furthermore, the other output port of the optical switch is coupled to an optical path led out of the coupling point of the optical path Pc1 through which the signal light input from the optical fiber F21 of the branch transmission path L2 propagates and a branch-side input end of the optical circuit 21B.

The coupling point is formed so that light from the optical path Pc1 is merged with light from the other output port at the coupling point.

In addition, the optical path switching circuit 24D has a configuration in which an optical switch with one input and two outputs is disposed on the optical path Pd2, through which the signal light separated by the optical circuit 21B and output to the optical fiber F24 of the branch transmission path L2 is propagated.

The input port of the optical switch is coupled to the optical path Pd2 coupled to the branch-side output end of the optical circuit 21A. In addition, one of the output ports of the optical switch is coupled to the optical path Pd2 that is coupled to the optical fiber F24 of the branch transmission path L2. Furthermore, the other output port of the optical switch is coupled to an optical path led out of the coupling point of the optical path Pd1 through which the signal light input from the optical fiber F23 of the branch transmission path L2 is propagated and a branch-side input end of the optical circuit 21A.

The coupling point is formed so that light from the optical path Pd1 is merged with light from the other output port at the coupling point.

The operation performed by the optical transmission system according to the present embodiment when the OADM-BU 20 enters an input signal loss state is described next.

Figure 6:
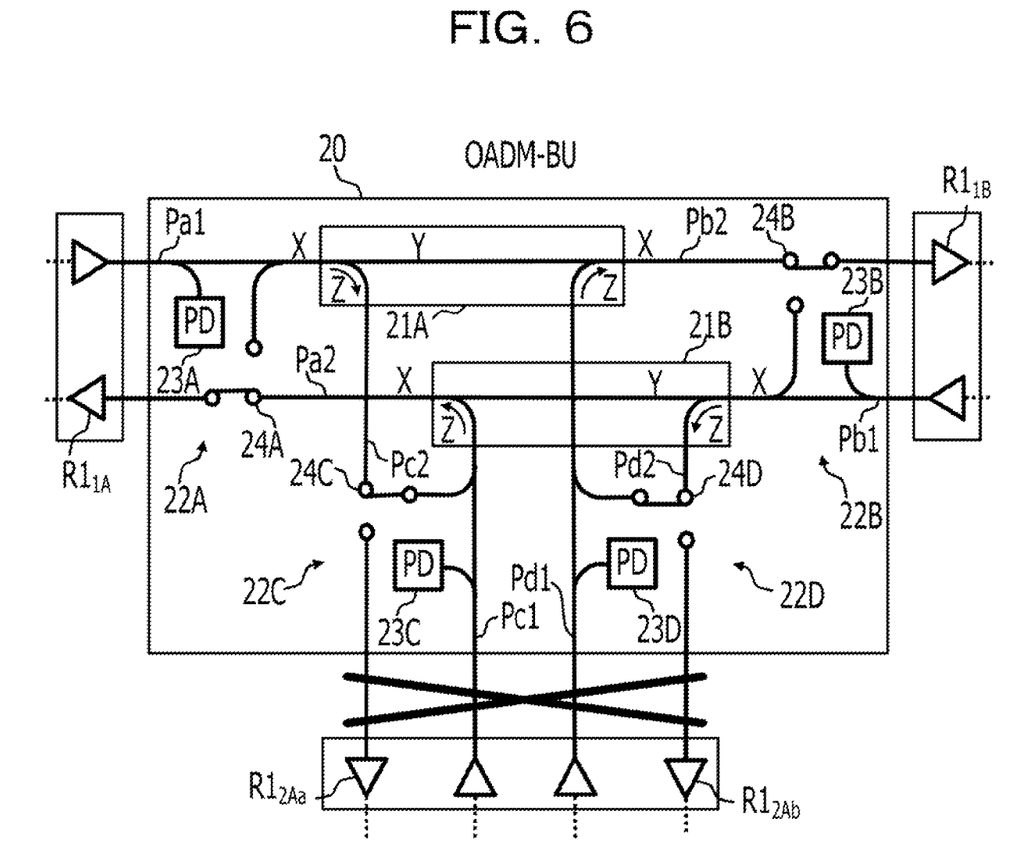
FIG. 6 illustrates an exemplary operation performed by the system shown in FIG. 4 when a failure occurs on a branch transmission path.

Suppose that, in an optical transmission system having the above-described configuration, a failure occurs on the branch transmission path L2 coupled to the input/output port of the OADM-BU 20 on the branch side, as indicated by a bold line shown in FIG. 6. At that time, signal lights output from the branch station 2A towards the submarine optical WDM terminal station apparatuses SLTE-1A and SLTE-1B are not input to the input/output units 22C and 22D of the OADM-BU 20 on the branch side, respectively.

Accordingly, the power of the input light detected by each of the input determination circuits 23C and 23D of the OADM-BU 20 is lower than the threshold value. Thus, the input determination circuits 23C and 23D determine that inputting of the signal light received from the branch transmission path L2 is stopped. The results of determination are sent to the optical path switching circuits 24C and 24D.

Upon receiving the result indicative of the input signal loss determined by the input determination circuit 23C, the optical path switching circuit 24C couples the input port of the optical switch to one of the two output ports that is coupled to the optical path Pc1 and, therefore, a loop-back route is formed. In addition, upon receiving the result indicative of the input signal loss determined by the input determination circuit 23D, the optical path switching circuit 24D couples the input port of the optical switch to one of the two output ports that is coupled to the optical path Pd1 and, therefore, a loop-back route is formed.

In contrast, the WDM lights are input from the main transmission paths L1 on the sides of the submarine optical WDM terminal station apparatuses SLTE-1A and SLTE-1B to the OADM-BU 20. Accordingly, the power of the input light detected by each of the input determination circuits 23A and 23B is higher than or equal to the threshold value. Therefore, the input determination circuits 23A and 23B determine that the WDM lights are input from the main transmission path L1 to the input/output unit 22A and the input/output unit 22B, respectively. The results of the determination are sent to the optical path switching circuits 24A and 24B.

Upon receiving the result of determination from the input determination circuit 23A, the optical path switching circuit 24A couples the input port of the optical switch to one of the two output ports that is coupled to the optical path Pa2. Similarly, upon receiving the result of determination from the input determination circuit 23B, the optical path switching circuit 24B couples the input port of the optical switch to one of the two output ports that is coupled to the optical path Pb2.

In this way, the optical path switching circuits 24A to 24D enter the above-described coupling states in accordance with the results of determination made by the input determination circuits 23A to 23D, respectively. Thus, the signal light separated by the optical circuit 21A and transmitted to the optical path Pct, that is, the signal light having a number of wavelengths of Z and transmitted from the submarine optical WDM terminal station apparatus SLTE-1A to the branch station 2A, is provided to the branch-side input end of the optical circuit 21B via the loop-back route formed by the optical path switching circuit 24C. In the optical circuit 21B, the loop-backed signal light having a number of wavelengths of Z is combined with the signal light having a number of wavelengths of Y transmitted from the submarine optical WDM terminal station apparatus SLTE-1A to the submarine optical WDM terminal station apparatus SLTE-1B. Accordingly, a WDM light having a number of wavelengths of X (=Y+Z) is output from the optical circuit 21B to the main transmission path L1 on the side of the submarine optical WDM terminal station apparatus SLTE-1A via the optical path Pa2 and the optical path switching circuit 24A.

In addition, the signal light separated by the optical circuit 21B and transmitted to the optical path Pd2, that is, the signal light having a number of wavelengths of Z and transmitted from the submarine optical WDM terminal station apparatus SLTE-1B to the branch station 2A, is provided to the branch-side input end of the optical circuit 21A via the loop-back route formed by the optical path switching circuit 24D. In the optical circuit 21A, the loop-backed signal light having a number of wavelengths of Z is combined with the signal light having a number of wavelengths of Y transmitted from the submarine optical WDM terminal station apparatus SLTE-1A to the submarine optical WDM terminal station apparatus SLTE-1B. Accordingly, a WDM light having a number of wavelengths of X (=Y+Z) is output from the optical circuit 21A to the main transmission path L1 on the side of the submarine optical WDM terminal station apparatus SLTE-1B via the optical path Pb2 and the optical path switching circuit 24B.

Accordingly, even when a failure occurs in the branch transmission path L2 and, therefore, the signal light transmitted from the side of the branch station 2A to the sides of the submarine optical WDM terminal station apparatuses SLTE-1A and SLTE-1B is not input to the OADM-BU 20, the total number of wavelengths of the WDM light output from the OADM-BU 20 to each of the main transmission paths L1 on the sides of the submarine optical WDM terminal station apparatuses SLTE-1A and SLTE-1B remains as X, which is the same number as that of before an input signal loss state of the OADM-BU 20 occurs. Therefore, the power of the signal light for each of the wavelengths, output from each of the optical amplifier R11A of the optical repeater R adjacent to the OADM-BU 20 on the main transmission path L1 on the side of the submarine optical WDM terminal station apparatus SLTE-1A and the optical amplifier R11B of the optical repeater R adjacent to the OADM-BU 20 on the main transmission path L1 on the side of the submarine optical WDM terminal station apparatus SLTE-1B, is constant regardless of whether the OADM-BU 20 enters an input signal loss state. As a result, without being directly affected by the occurrence of a failure of the branch transmission path L2, excellent transmission quality of the signal light communicated between the submarine optical WDM terminal station apparatuses SLTE-1A and SLTE-1B via the main transmission path L1 can be maintained.

After the failure occurring on the branch transmission path L2 is recovered, the signal light transmitted from the branch station 2A to the submarine optical WDM terminal station apparatuses SLTE-1A and SLTE-1B is input to the OADM-BU 20 in the following manner.

At that time, the power of the input light detected by each of the input determination circuits 23C and 23D of the OADM-BU 20 is higher than or equal to the threshold value. Thus, the input determination circuits 23C and 23D determine that the signal light is being input from the branch transmission path L2 to the input/output units 22C and 22D, respectively. Thereafter, upon receiving the result of determination made by the input determination circuit 23C, the optical switch of the optical path switching circuit 24C performs a switching operation so that the input port of the optical switch is coupled to one of the two output ports that is coupled to the optical path Pct. At the same time, upon receiving the result of determination made by the input determination circuit 23D, the optical switch of the optical path switching circuit 24D performs a switching operation so that the input port of the optical switch is coupled to one of the two output ports that is coupled to the optical path Pd2. In this way, communication of the signal light between the branch station 2A and each of the submarine optical WDM terminal station apparatuses SLTE-1A and SLTE-1B can be automatically restarted.

Figure 7:
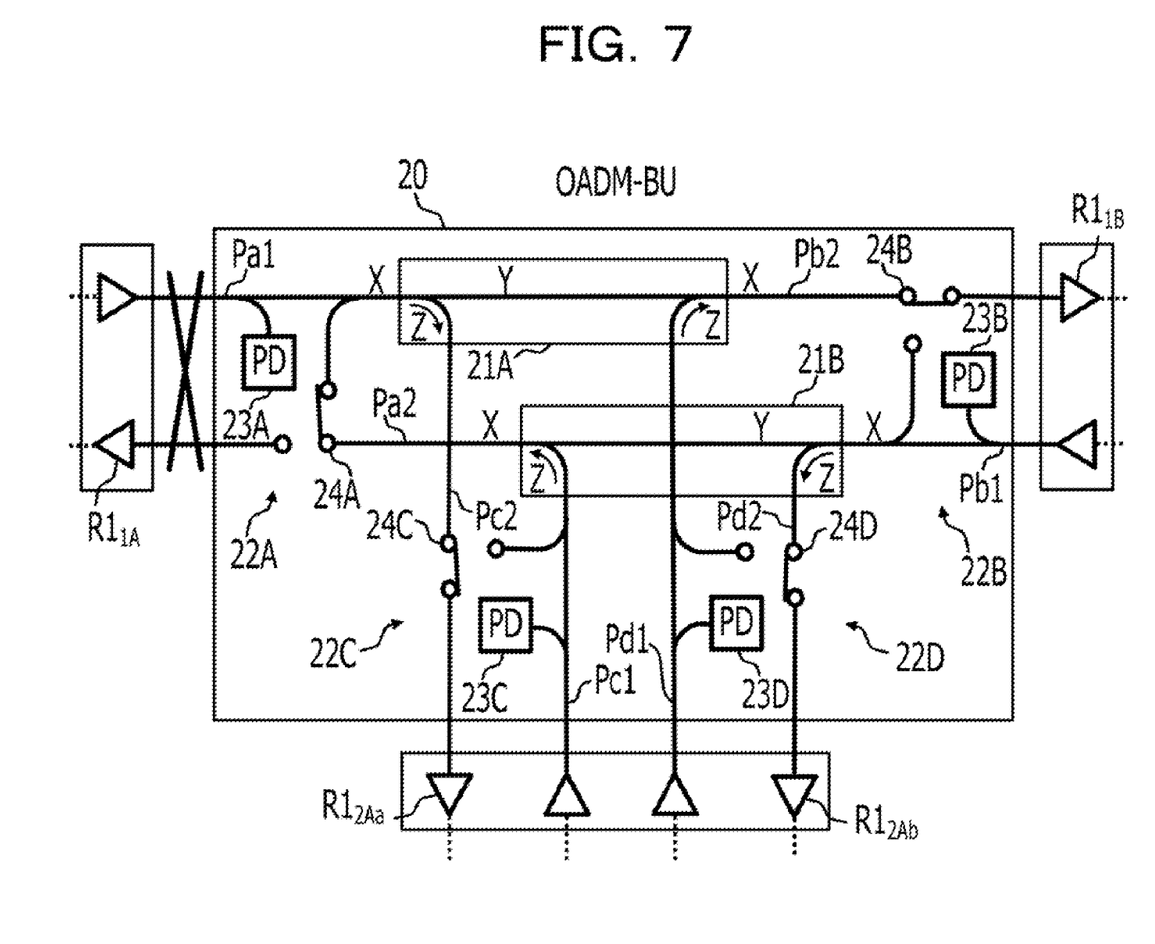
FIG. 7 illustrates an exemplary operation performed by the system shown in FIG. 1 when a failure occurs on a main transmission path on the side of a trunk-line station 1A.

The case in which a failure occurs on the main transmission path L1 coupled to the OADM-BU 20 on the side of the submarine optical WDM terminal station apparatus SLTE-1A, as shown in FIG. 7, is discussed next. At that time, the WDM light output from the submarine optical WDM terminal station apparatus SLTE-1A to the submarine optical WDM terminal station apparatus SLTE-1B and the branch station 2A is not input to the input/output unit 22A of the OADM-BU 20 on the side of the submarine optical WDM terminal station apparatus SLTE-1A.

Thus, the power of an input light detected by the input determination circuit 23A of the OADM-BU 20 becomes lower than the threshold value. Therefore, the input determination circuit 23A determines that the WDM light input from the main transmission path L1 on the side of the submarine optical WDM terminal station apparatus SLTE-1A is lost. The determination result is sent to the optical path switching circuit 24A. Upon receiving the result of the determination made by the input determination circuit 23A and indicating the input signal loss, the optical path switching circuit 24A couples the input port of the optical switch to one of the two output ports that is coupled to the optical path Pa1. In this way, a loop-back route is formed.

In contrast, since the WDM light is input from the main transmission path L1 on the side of the submarine optical WDM terminal station apparatus SLTE-1B to the input/output unit 22B of the OADM-BU 20, the power of an input light detected by the input determination circuit 23B is higher than or equal to the threshold value. Accordingly, the input determination circuit 23B determines that the WDM light is being input from the main transmission path L1 to the input/output unit 22B. The result of determination is sent to the optical path switching circuit 24B. In addition, since the signal light is input from the branch transmission path L2 to the input/output units 22C and 22D of the OADM-BU 20 as well, the power of an input light detected by each of the input determination circuits 23C and 23D is higher than or equal to the threshold value. Therefore, the input determination circuits 23C and 23D determine that the signal light is being input from the branch transmission path L2 to the input/output units 22C and 22D, respectively. The results of determination are sent to the optical path switching circuits 24C and 24D.

Upon receiving the result of determination made by the input determination circuit 23B, the optical path switching circuit 24B couples the input port of the optical switch to one of the two output ports that is coupled to the optical path Pb2. In addition, upon receiving the results of determination made by the input determination circuits 23C and 23D, the optical path switching circuits 24C and 24D couple the input port of the optical switch to one of the two output ports that is coupled to the optical paths Pct and Pd2, respectively.

In this way, the optical path switching circuits 24A to 24D have the above-described coupling states in accordance with the results of determination made by the input determination circuits 23A to 23D, respectively. Thus, the WDM light transmitted to the optical path Pa2 via the optical circuit 21B, that is, the WDM light having a number of wavelengths of X (=Y+Z) transmitted from the submarine optical WDM terminal station apparatus SLTE-1B and the branch station 2A to the submarine optical WDM terminal station apparatus SLTE-1A, is provided to the trunk-line side input end of the optical circuit 21A via the loop-back route formed by the optical path switching circuit 24A. In the optical circuit 21A, a signal light having a number of wavelengths of Z to be transmitted from the branch station 2A to the submarine optical WDM terminal station apparatus SLTE-1A is branched from the loop-backed WDM light having a number of wavelengths of X (=Y+Z). In addition, a signal light having a number of wavelengths of Y to be transmitted from the submarine optical WDM terminal station apparatus SLTE-1A to the submarine optical WDM terminal station apparatus SLTE-1B is combined with the signal light having a number of wavelengths of Z transmitted from the branch station 2A to the submarine optical WDM terminal station apparatus SLTE-1B. In this way, the WDM light having a number of wavelengths of X (=Y+Z) is output from the optical circuit 21A to the main transmission path L1 on the side of the submarine optical WDM terminal station apparatus SLTE-1B via the optical path Pb2 and the optical path switching circuit 24B.

Accordingly, even when a failure occurs on the main transmission path L1 on the side of the submarine optical WDM terminal station apparatus SLTE-1A and, therefore, the WDM light transmitted from the submarine optical WDM terminal station apparatus SLTE-1A to the side of the submarine optical WDM terminal station apparatus SLTE-1B and the branch station 2A is not input to the OADM-BU 20, the total number of wavelengths of the WDM light output from the OADM-BU 20 to the main transmission paths L1 on the sides of the submarine optical WDM terminal station apparatus SLTE-1B remains as X, which is the same number as that of before an input signal loss state of the OADM-BU 20 occurs. Therefore, the power of the signal light of the WDM light for each of the wavelengths output from the optical amplifier R11B of the optical repeater R adjacent to the OADM-BU 20 on the main transmission path L1 on the side of the submarine optical WDM terminal station apparatus SLTE-1B is constant regardless of whether the OADM-BU 20 enters an input signal loss state. As a result, without being directly affected by the occurrence of a failure of the branch transmission path L1 on the side of the submarine optical WDM terminal station apparatus SLTE-1A, the transmission quality of the signal light communicated between the submarine optical WDM terminal station apparatuses SLTE-1B and the branch station 2A via the main transmission path L1 on the side of the submarine optical WDM terminal station apparatus SLTE-1B and the branch transmission path L2 can be maintained in an excellent state.

After the failure occurring on the main transmission path L1 on the side of the submarine optical WDM terminal station apparatus SLTE-1A is recovered, the WDM light transmitted from the submarine optical WDM terminal station apparatus SLTE-1A to the submarine optical WDM terminal station apparatus SLTE-1B and the branch station 2A is input to the OADM-BU 20. At that time, the power of the input light detected by the input determination circuit 23A is higher than or equal to the threshold value. Thus, the input determination circuit 23A determines that the signal light is being input from the main transmission path L1 on the side of the submarine optical WDM terminal station apparatus SLTE-1A to the input/output units 22A. Thereafter, upon receiving the result of determination made by the input determination circuit 23A, the optical switch of the optical path switching circuit 24A performs a switching operation so that the input port of the optical switch is coupled to one of the two output ports that is coupled to the optical path Pa2. In this way, communication of the signal light between the branch station 2A and each of the submarine optical WDM terminal station apparatuses SLTE-1A and SLTE-1B can be automatically restarted.

Figure 8:
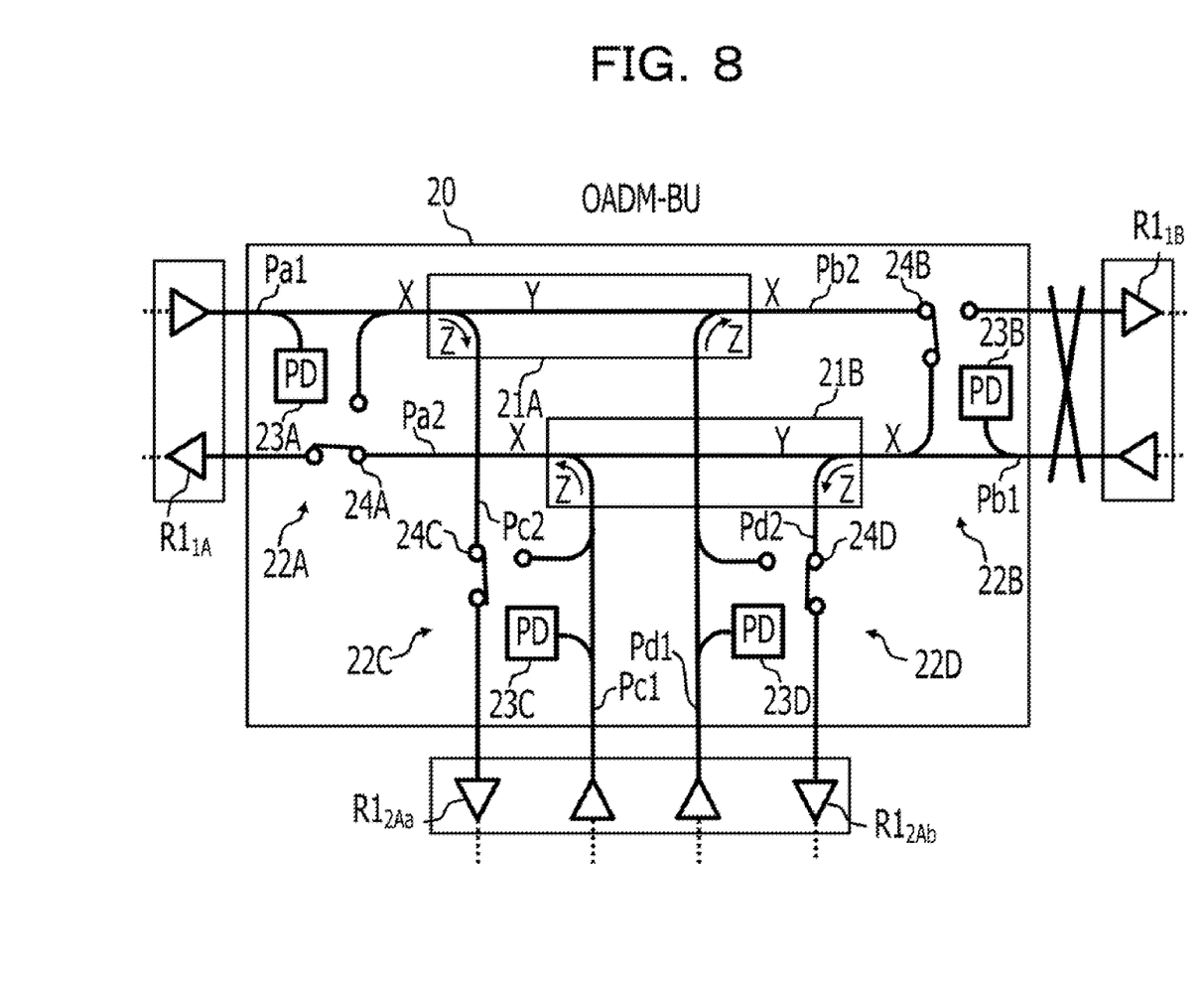
FIG. 8 illustrates an exemplary operation performed by the system shown in FIG. 1 when a failure occurs on a main transmission path on the side of a trunk-line station 1B.

Finally, for example, if, as shown in FIG. 8, a failure occurs on the main transmission path L1 coupled to the OADM-BU 20 on the side of the submarine optical WDM terminal station apparatus SLTE-1B, the WDM light transmitted from the submarine optical WDM terminal station apparatus SLTE-1B to the submarine optical WDM terminal station apparatus SLTE-1A and the branch station 2A is not input to the input/output unit 22B of the OADM-BU 20 on the side of the submarine optical WDM terminal station apparatus SLTE-1B. Accordingly, the power of the input light detected by the input determination circuit 23B of the OADM-BU 20 is lower than the threshold value. Thus, the input determination circuit 23B determines that the WDM light input from the main transmission path L1 on the side of the submarine optical WDM terminal station apparatus SLTE-1B is lost. The result of determination is sent to the optical path switching circuit 24B. Upon receiving the result of the determination made by the input determination circuit 23B and indicating that the input signal loss, the optical path switching circuit 24B couples the input port of the optical switch to one of the two output ports that is coupled to the optical path Pb1 and, thereby a loop-back route is formed.

In contrast, since the WDM light is input from the main transmission path L1 on the side of the submarine optical WDM terminal station apparatus SLTE-1A to the input/output unit 22A of the OADM-BU 20, the power of the input light detected by the input determination circuit 23A is higher than or equal to the threshold value. Thus, the input determination circuit 23A determines that the WDM light is being input from the main transmission path L1 to the input/output unit 22A. The result of determination is sent to the optical path switching circuit 24A. In addition, since the signal light is also input from the branch transmission path L2 to the input/output units 22C and 22D of the OADM-BU 20, the power of an input light detected by each of the input determination circuits 23C and 23D is higher than or equal to the threshold value. Accordingly, the input determination circuits 23C and 23D determine that the signal light is input from the branch transmission path L2 to the input/output units 22C and 22D, respectively. The results of determination are sent to the optical path switching circuits 24C and 24D.

Upon receiving the results of determination made by the input determination circuit 23A, the optical path switching circuit 24A couples the input port of the optical switch to one of the two output ports that is coupled to the optical path Pa2. In addition, upon receiving the results of determination made by the input determination circuits 23C and 23D, the optical path switching circuits 24C and 24D couple the input port of the optical switch to one of the two output ports that is coupled to the optical path Pct or Pd2, respectively.

In this way, the optical path switching circuits 24A to 24D enter the above-described coupling states in accordance with the results of determination made by the input determination circuits 23A to 23D, respectively. Thus, the WDM light transmitted to the optical path Pb2 via the optical circuit 21A, that is the WDM light having a number of wavelengths of X (=Y+Z) and transmitted from the submarine optical WDM terminal station apparatus SLTE-1A and the branch station 2A to the submarine optical WDM terminal station apparatus SLTE-1B, is provided to the trunk-line side input end of the optical circuit 21B via the loop-back route formed by the optical path switching circuit 24B. In the optical circuit 21B, the signal light having a number of wavelengths of Z to be transmitted from the branch station 2A to the submarine optical WDM terminal station apparatus SLTE-1B is branched from the loop-backed WDM light having a number of wavelengths of X (=Y+Z). In addition, the signal light having a number of wavelengths of Y to be transmitted from the submarine optical WDM terminal station apparatus SLTE-1A to the submarine optical WDM terminal station apparatus SLTE-1B is combined with the signal light having a number of wavelengths of Z transmitted from the branch station 2A to the submarine optical WDM terminal station apparatus SLTE-1A. Accordingly, a WDM light having a number of wavelengths of X (=Y+Z) is output from the optical circuit 21B to the main transmission path L1 on the side of the submarine optical WDM terminal station apparatus SLTE-1A via the optical path Pa2 and the optical path switching circuit 24A.

Accordingly, even when a failure occurs in the main transmission path L1 on the side of the submarine optical WDM terminal station apparatus SLTE-1B and, therefore, the WDM light transmitted from the submarine optical WDM terminal station apparatus SLTE-1B to the submarine optical WDM terminal station apparatus SLTE-1A and the branch station 2A is not input to the OADM-BU 20, the total number of wavelengths of the WDM light output from the OADM-BU 20 to the main transmission paths L1 on the sides of the submarine optical WDM terminal station apparatus SLTE-1A remains as X, which is the same number as that before an input signal loss state of the OADM-BU 20 occurs. Therefore, the power of the signal light for each of the wavelengths output from the optical amplifier R11A of the optical repeater R adjacent to the OADM-BU 20 on the main transmission path L1 on the side of the submarine optical WDM terminal station apparatus SLTE-1A is constant regardless of whether the OADM-BU 20 enters an input signal loss state. As a result, without being directly affected by the occurrence of a failure on the main transmission path L1 on the side of the submarine optical WDM terminal station apparatus SLTE-1B, an excellent transmission quality of the signal light communicated between the submarine optical WDM terminal station apparatus SLTE-1A and the branch station 2A via the main transmission path L1 on the side of the submarine optical WDM terminal station apparatus SLTE-1A and the branch transmission path L2 can be maintained.

After the failure occurring on the main transmission path L1 on the side of the submarine optical WDM terminal station apparatus SLTE-1B is recovered, the WDM light transmitted from the submarine optical WDM terminal station apparatus SLTE-1B to the submarine optical WDM terminal station apparatus SLTE-1A and the branch station 2A is input to the OADM-BU 20. At that time, the power of the input light detected by the input determination circuit 23B is higher than or equal to the threshold value. Thus, the input determination circuit 23B determines that the WDM light is being input from the main transmission path L1 on the side of the submarine optical WDM terminal station apparatus SLTE-1B to the input/output unit 22B. Thereafter, upon receiving the result of determination made by the input determination circuit 23B, the optical switch of the optical path switching circuit 24B performs a switching operation so that the input port of the optical switch is coupled to one of the two output ports that are coupled to the optical path Pb2. In this way, communication of the signal light between the branch station 2A and each of the submarine optical WDM terminal station apparatuses SLTE-1A and SLTE-1B can be automatically restarted.

As described above, according to the optical transmission system of the present embodiment, the input determination circuits 23A to 23D and the optical path switching circuits 24A to 24D each having a simplified structure are additionally provided to the OADM-BU 20. Accordingly, even when part of a light input to the OADM-BU 20 is lost due to the occurrence of a failure, a loop-back route is automatically formed for the input light and, therefore, the quality of the signal light transmitted in a section that is not related to a section in which the failure occurs can be favorably maintained. Since the above-described OADM-BU 20 has a simplified configuration, high reliability can be realized at low cost. Furthermore, since a loop-back route is automatically formed when a failure occurs and the loop-back route is automatically removed when the failure is recovered, the maintenance of the system is facilitated when a failure occurs.

While the foregoing embodiment has been described with reference to the case in which both the branch station 2A and the submarine optical WDM terminal station apparatuses SLTE-1A and SLTE-1B include a submarine WDM terminal station apparatus, the present invention is also applicable to a variety of optical transmission systems including an optical repeater and an optical add/drop multiplexer on a main transmission path that bi-directionally couples a plurality of terminal stations with one another. In addition, the present invention is applicable to a variety of network structures by using the above-described structure as a base unit and coupling a plurality of base units with one another.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical transmission system comprising:
first, second, and third terminal stations each transmitting and receiving a WDM light formed by combining a plurality of lights having different wavelengths;
a main transmission path that bi-directionally couples the first terminal station with the second terminal station; and
an optical add/drop multiplexer disposed on the main transmission path, the optical add/drop multiplexer branching light having a certain wavelength from a WDM light input from the main transmission path on the side of the first terminal station and outputting the branched light to a branch transmission path coupled with the third terminal station, the optical add/drop multiplexer combining a light input from the branch transmission path with lights included in the WDM light other than the light having a certain wavelength, and outputting the combined light to the main transmission path on the side of the second terminal station, the optical add/drop multiplexer branching light having a certain wavelength from a WDM light input from the main transmission path on the side of the second terminal station and outputting the branched light to the branch transmission path, and the optical add/drop multiplexer combining a light input from the branch transmission path with lights included in the WDM light other than the light having the certain wavelength and outputting the combined light to the main transmission path on the side of the first terminal station;
the optical add/drop multiplexer comprising:
an input determination unit and an optical path switching unit, wherein the input determination unit detects the power of the light input from the main transmission path on the side of the first terminal station, the power of the light input from the main transmission path on the side of the second terminal station, and the power of the light input from the branch transmission path and determines whether each of the input lights is lost or not, and wherein, if the input determination unit determines that any one of the input lights is lost, the optical path switching unit forms a loop-back route by decoupling an optical path through which an output light output to the transmission path corresponding to the input light is propagated from the transmission path and by coupling the optical path to the opposing optical path to which the input light is provided from the transmission path.

2. The optical transmission system according to claim 1, wherein after the input determination unit determines if any one of the input lights is lost and that the input light loss state is recovered, the optical path switching unit switches a coupling destination of an optical path through which a light output to the transmission path corresponding to the input light is propagated from the opposing optical path to the transmission path.

3. The optical transmission system according to claim 1, wherein the main transmission path includes a first optical fiber through which a WDM light transmitted from the first terminal station is unidirectionally propagated and a second optical fiber through which a WDM light transmitted from the second terminal station is propagated in a direction opposite to the direction in which the WDM light propagates in the first optical fiber, and wherein the branch transmission path includes a third optical fiber through which a signal light transmitted from the third terminal station to the first terminal station is unidirectionally propagated, a fourth optical fiber through which a signal light transmitted from the third terminal station to the second terminal station is unidirectionally propagated, a fifth optical fiber through which a signal light transmitted from the first terminal station to the third terminal station is propagated in a direction opposite to the direction in which the signal light is propagated through the third optical fiber, and a sixth optical fiber through which a signal light transmitted from the second terminal station to the third terminal station is propagated in a direction opposite to the direction in which the signal light is propagated through the fourth optical fiber, and wherein the optical add/drop multiplexer includes a first optical circuit and a second optical circuit, and wherein the first optical circuit outputs a signal light separated from a WDM light input from the first optical fiber of the main transmission path located on the first terminal station side to the fifth optical fiber of the branch transmission path, merges the remainder of the signal lights of the WDM light with a signal light input from the fourth optical fiber of the branch transmission path, and outputs the combined light to the first optical fiber of the main transmission path located on the second terminal station side; the second optical circuit outputs a signal light separated from a WDM light input from the second optical fiber of the main transmission path located on the second terminal station side to the sixth optical fiber of the branch transmission path, merges the remainder of the signal lights of the WDM light with a signal light input from the third optical fiber of the branch transmission path, and outputs the combined light to the second optical fiber of the main transmission path located on the first terminal station side.

4. The optical transmission system according to claim 3, wherein each of the first and second optical circuits is formed by combining an optical circulator and a fiber Bragg grating.

5. The optical transmission system according to claim 3, wherein each of the first and second optical circuits is formed by combining an optical coupler and an optical filter.

6. The optical transmission system according to claim 3, wherein the input determination unit includes a first input determination unit circuit configured to detect power of a first input light received from the first optical fiber and to determine that the first input light is lost if the result of detection is lower than a certain threshold value, a second input determination unit circuit configured to detect power of a second input light received from the second optical fiber and to determine that the second input light is lost if the result of detection is lower than the threshold value, a third input determination unit circuit configured to detect power of a third input light received from the third optical fiber and to determine that the third input light is lost if the result of detection is lower than the threshold value, and a fourth input determination unit circuit configured to detect power of a fourth input light received from the fourth optical fiber and determine that the fourth input light is lost if the result of detection is lower than the threshold value.

7. The optical transmission system according to claim 3, wherein the optical path switching unit includes a first optical path switching circuit, a second optical path switching circuit, a third optical path switching circuit, and a fourth optical path switching circuit, and wherein the first optical path switching circuit includes a first optical switch with one input and two outputs, an input port of the first optical switch is coupled to an optical path that is coupled to a main-transmission-path-side output end of the second optical circuit, one of the output ports is coupled to an optical path that is coupled to the second optical fiber of the main transmission path located on the side of the first terminal station, and the other output port is coupled to an optical path led out of a coupling point of an optical path coupled to the first optical fiber of the main transmission path located on the side of the first terminal station and a main-transmission-path side input end of the first optical circuit, and wherein the second optical path switching circuit includes a second optical switch with one input and two outputs, an input port of the second optical switch is coupled to an optical path that is coupled to a main-transmission-path-side output end of the first optical circuit, one of output ports is coupled to an optical path that is coupled to the first optical fiber of the main transmission path located on the side of the second terminal station, and the other output port is coupled to an optical path led out of a coupling point of an optical path coupled to the second optical fiber of the main transmission path located on the side of the second terminal station and a main-transmission-path-side input end of the second optical circuit, and wherein the third optical path switching circuit includes a third optical switch with one input and two outputs, an input port of the third optical switch is coupled to an optical path that is coupled to an output end of the first optical circuit on the branch side, one of the output ports is coupled to an optical path that is coupled to the fifth optical fiber of the branch transmission path, and the other output port is coupled to an optical path led out of a coupling point of an optical path coupled to the third optical fiber of the branch transmission path and a branch-side input end of the second optical circuit, and wherein the fourth optical path switching circuit includes a fourth optical switch with one input and two outputs, an input port of the fourth optical switch is coupled to an optical path that is coupled to a branch-side output end of the second optical circuit, one of the output ports is coupled to an optical path that is coupled to the sixth optical fiber of the branch transmission path, and the other output port is coupled to an optical path led out of a coupling point of an optical path coupled to the fourth optical fiber of the branch transmission path and a branch-side input end of the first optical circuit.

* * * * *